(No Model.)

R. C. FUNKE.
HAMMOCK.

No. 534,622.  Patented Feb. 19, 1895.

WITNESSES:
W. C. Heflagle C.E.
K. M. Gilligan

INVENTOR
Robert C. Funke
BY Augustus B. Stoughton
ATTORNEY

UNITED STATES PATENT OFFICE.

ROBERT C. FUNKE, OF PHILADELPHIA, PENNSYLVANIA.

HAMMOCK.

SPECIFICATION forming part of Letters Patent No. 534,622, dated February 19, 1895.

Application filed December 21, 1893. Serial No. 494,284. (No model.)

*To all whom it may concern:*

Be it known that I, ROBERT C. FUNKE, a citizen of the United States, residing in the city and county of Philadelphia and State of Pennsylvania, have invented certain new and useful Improvements in Hammocks, of which the following is a specification.

Hitherto it has been customary to secure the suspension ropes of hammocks to the bed or body or to tabs or projections formed at the ends thereof by means of knots and loops passing around the exterior and through the tabs or projections or around or through portions of the bed or body. However, these tying and looping operations are laborious, require the expenditure of considerable time and care, and consequently are expensive and unsatisfactory.

The principal object of my present invention is to obviate the above mentioned disadvantageous features and to provide simple, durable, neat, attractive, and comparatively inexpensive means that may be readily and rapidly applied and that in use firmly and securely hold the suspension cord or cords to place and that may be employed for securing sockets for a spreader.

In my invention use is made of clips or clamps encircling and clinching portions of the hammock body or bed or tabs or projections formed thereon, and clamping or binding the same firmly to the ends of the suspension cord or cords, and when required also to sockets adapted for the reception of the ends of the spreader.

My invention consists of the improvements hereinafter fully described and particularly referred to in the claims.

The nature, characteristic features, and scope of my invention, will be more fully understood from the following description taken in connection with the accompanying drawings forming part hereof, and in which—

Figure 1:
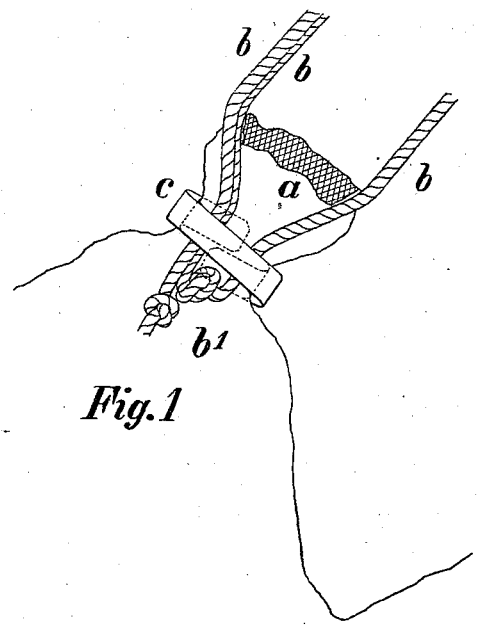
Figure 2:
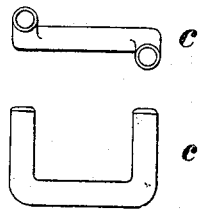
Figure 3:
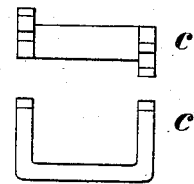
Figure 4:
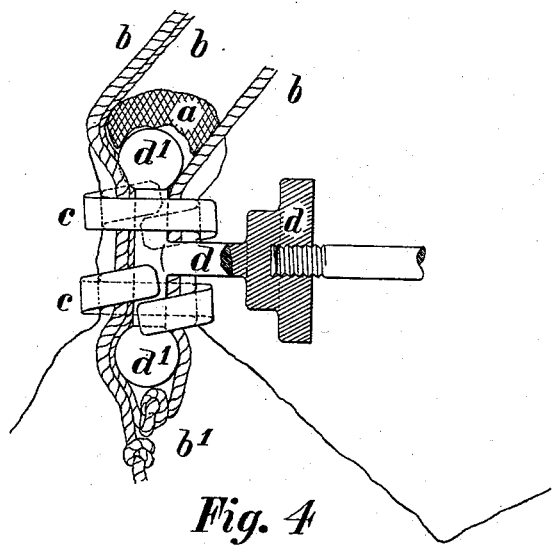
Figure 5:
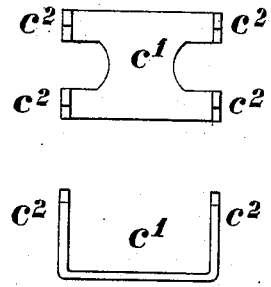

Figure 1, is a top or plan view of a portion of a hammock showing a tab or projection and illustrating my invention in application thereto. Fig. 2, illustrates, in elevation and plan, a U-shaped clip or clamp having arms of circular cross section inclined laterally in opposite directions away from each other. Fig. 3, is a similar view illustrating a U-shaped clip or clamp having its arms of rectangular cross section. Fig. 4, is a top or plan view of a tab or projection showing a spreader socket and also suspension cords secured thereto by means of two separate clamps or clips, and Fig. 5, illustrates plan and elevational views of a clip or clamp provided with four encircling prongs and adapted for use in securing a socket to place.

In the drawings, $a$, is one of the tabs or projections formed at or applied to the end of a hammock bed or body not shown.

$b$, are one or more suspension cords radiating from a suspension eye or ring, not shown, and supporting the hammock bed.

$c$, is a clamp or clip that encircles and clinches the tab or projection $a$, and thus binds the same firmly to the cord or cords $b$.

As illustrated in the drawings, the cords $b$, are knotted as at $b'$, and these knots are inserted in the tab or projection and are disposed in rear of the clamp or clip $c$, thus preventing any liability of the cord or cords pulling out or of becoming otherwise detached. However, the particular type of knots shown are not essential as other forms of knots may be readily employed or, in certain cases, the knots may be dispensed with, for example, when the suspension cords are attached to a stretcher in the manner illustrated in my application, Serial No. 507,961, filed April 18, 1894.

The clip or clamp $c$, may be composed of ordinary wire and hence of circular cross section, as shown in Fig. 2, or it may be made of bar iron, as shown in Fig. 3, in which case it is generally rectangular in cross section. The clamp or clip shown is of U-shape and has its prongs inclined laterally away from each other, so that when clinched, they occupy positions side by side, as illustrated in Fig. 1; but the form or shape of the clip or clamp is not material so long as it is adapted to encompass the tabs and cords and clamp or clinch the same to place. These clips or clamps $c$, may be advantageously employed, not only for securing the suspension cords $b$, to the tabs or tags $a$, or to portions of the hammock bed or body, as has been above described, but also for securing a socket for the reception of a spreader to place.

In Fig. 4, of the accompanying drawings, I have illustrated two clips or clamps $c$, in application to a socket *d*, such as is described, illustrated, and claimed in my application for a patent, Serial No. 489,347, filed October 30, 1893. However, the particular type of socket employed is not material to the present invention and the type shown is selected merely for purposes of illustration. When a socket is employed, the clips or clamps are located upon its opposite sides, and thus serve to retain it firmly to place.

Instead of employing two separate rings or clips for securing the socket to place, as shown in Fig. 4, use may be made of a clip or clamp *c'*, having four prongs *c²*, as illustrated in Fig. 5, which are adapted to be bent or clinched in pairs around the tab or projection and upon opposite sides of the socket *d*.

In use, the cords *b*, may be formed by attaching a continuous cord to a suspension ring and they may be knotted as at *b'*, and these knotted portions may be applied to the tab or projection *a*, or to a portion of the hammock body or bed, whereupon the clamp or clip *c*, is placed over the exterior of the projection or tab or the portion of the hammock body or bed and in front of the knots, and its ends or prongs are bent downward and inward onto each other or side by side by means of a hammer or other suitable tool, which operation may be rapidly performed, and results in the formation of a longitudinally ranging tubular opening through which the cord or cords passes or pass and which, by reason of the folding or gathering of the material, is axially split at the meeting edges of the material and at the points of the clamp or clip. However, if preferred, the longitudinally ranging axially split tubular openings may be first formed by gathering the material of the bed or body and the suspension cords may then be inserted therethrough and knotted. In either case, if the suspension cords which are tied to the suspension ring are not of the right length, they may be readily adjusted by tying or untying some of the knots and a stretcher may be readily applied to the cords as is set forth in my application, Serial No. 507,961.

To bunch or gather a portion of the bed or body so as to constitute a tubular opening ranging in the direction of the length of the hammock and being radially split (that is to say open at its meeting edges) and adapted for the reception of the suspension cords is advantageous when compared with the usual means of attachment wherein the hammock bed or at least its warp threads are doubled over to constitute transversally ranging loops through which the suspension cord passes. In the former case a continuous cord may be tied onto the suspension ring first and at one operation and in such manner as to form two stranded suspension cords and these latter may be inserted through the longitudinally ranging tubular openings. In such case, the strength of both cords is availed of whereas when such a cord is passed through a transverse loop, the strength of only one strand of cord is available for carrying weight. Where suspension cords comprising either one or two strands are employed and pass through the above described longitudinally ranging openings, they may be either knotted so as to properly adjust their length and constitue a hammock without a stretcher or they may at any time be looped around a stretcher as shown in my application, Serial No. 507,961. In the case of the known means of attachment above referred to, a single strand of cord must be tied to the ring, passed through and tied to the longitudinally ranging loops and then tied again to the ring, so that care must be exercised that the suspension cords shall be of proper length and if they are not of proper length, it is obviously difficult, if not impossible, to adjust them. Moreover if a stretcher is to be employed in such construction, it must be tied in by the suspension cords at the same time. Again a suspension cord that passes through a horizontally ranging loop, while it requires the use of two strands, presents only the strength of one.

In cases where it is desirable to employ a socket *d*, the latter is inserted in or otherwise applied to the tab or projection *a*, or to a suitable portion of the hammock body or bed together with the knotted or unknotted cord or cords *b*, whereupon two single clips or clamps are applied on opposite sides of the socket *d*, and are bent down around the tab or tag and around the arms *d'*, of the socket, if such arms are present, in the manner above described, thus insuring a firm attachment of the respective parts together.

Instead of using two clamps or clips, the single clamp, illustrated in Fig. 5, may be employed, and in such case, the prongs *c²*, are bent around the tab or projection *a*, or other suitable portion of the hammock bed or body, and around the arms *d'*, if present, of the socket, thus firmly securing the same as well as the cords to place.

It may be remarked, that when the socket is employed, the knotted parts *b'*, of the suspension cords *b*, may be located in rear of the clamp or clip, thus affording ample protection against slipping or detachment.

It will be obvious to those skilled in the art to which my invention relates that modifications may be made in details of construction and arrangement without departing from the spirit thereof. Hence I do not limit myself to the exact construction and arrangement of parts illustrated in the accompanying drawings and hereinabove set forth, but,

Having thus described the nature and objects of my present invention, what I claim as new, and desire to secure by Letters Patent, is—

1. The herein described improved means for attaching a hammock body to its suspension ring which comprise the combination of, a cord attached to the ring so as to form radiating suspension cords each consisting of a part as $b'$ of said cord, tabs projecting from the end of the hammock body and rolled into tubes ranging longitudinally thereof and through which the radiating suspension cords respectively pass, bands located intermediate of the length of said rolled tabs and encompassing and compressing the same onto and around the radiating suspension cords, and knots at the part $b'$ of each of said radiating suspension cords which afford means for adjusting their lengths in respect to each other and which are engaged and retained by and seated in one direction upon the contracted intermediate portions of the corresponding tabs and are concealed by the remaining portions thereof, substantially as described.

2. In combination, a hammock provided with a tab or projection, a suspension cord or cords, a spreader socket, and a clip or clamp for securing said tab or projection, cord or cords and socket, substantially as described.

3. In combination, a hammock provided with a tab or projection, a suspension cord or cords, a spreader socket inserted in said tab or projection, and a clip or clamp for securing said tab or projection, socket, and cord or cords, substantially as described.

4. In combination, a hammock provided with a tab or projection, a suspension cord or cords, a spreader socket provided with arms, a clip or clamp encircling each of said arms and said cord or cords and tab or projection, substantially as described.

5. In combination, a hammock provided with a tab or projection, a knotted suspension cord or cords inserted in said tab or projection, a spreader socket provided with arms and inserted in said tab or projection, and clips or clamps for securing said tab or projection, socket, and cords, substantially as described.

6. In combination, a hammock provided with a tab or projection, a spreader socket provided with arms, and a clip or clamp having four prongs clinched in pairs around said arms and projection or tab, substantially as described.

7. In combination, a hammock provided with a tab or projection, a spreader socket provided with arms, a suspension cord or cords, and a clip or clamp having four prongs clinched in pairs around said arms, projection or tab, and cord or cords, substantially as described.

8. A hammock provided with a tab or projection, a spreader socket provided with arms and inserted in the projection or tab, a knotted suspension cord or cords, and a clip or clamp having four prongs clinched in pairs around said arms, projection or tab, and cord or cords and located in advance of the knotted portion thereof, substantially as described.

In testimony whereof I have hereunto signed my name in the presence of two witnesses.

ROBERT C. FUNKE.

Witnesses:
K. M. GILLIGAN,
A. B. STOUGHTON.